United States Patent [19]

Blume

[11] Patent Number: 4,645,358
[45] Date of Patent: Feb. 24, 1987

[54] MEASUREMENT APPARATUS AND PROCEDURE FOR THE DETERMINATION OF SURFACE EMISSIVITIES

[75] Inventor: Hans-Juergen C. Blume, Hampton, Va.

[73] Assignee: The United States of America as represented by the Administrator of the National Aeronautics & Space Administration, Washington, D.C.

[21] Appl. No.: 804,040

[22] Filed: Dec. 3, 1985

[51] Int. Cl.$^4$ .................... G01J 5/00; G01N 25/00
[52] U.S. Cl. ........................................ 374/9; 250/341; 374/122
[58] Field of Search ............... 374/9, 126, 128, 117; 250/352, 484.1, 342

[56] References Cited

U.S. PATENT DOCUMENTS

| | | | |
|---|---|---|---|
| 3,028,596 | 4/1962 | McGillem et al. | 250/340 |
| 3,277,715 | 10/1966 | Vanderschmidt | 374/9 |
| 3,340,722 | 9/1967 | Gabron et al. | 374/9 X |
| 3,396,584 | 8/1968 | Badin et al. | 374/43 X |
| 3,564,420 | 2/1971 | Webb et al. | 374/122 |
| 3,778,837 | 12/1973 | Hardy | 343/703 |
| 3,922,550 | 11/1975 | Crowley et al. | 374/9 |
| 4,117,712 | 10/1978 | Hager, Jr. | 374/9 |
| 4,235,107 | 11/1980 | Lüdeke et al. | 374/122 |

Primary Examiner—Daniel M. Yasich
Attorney, Agent, or Firm—George F. Helfrich; John R. Manning; Robert D. Marchant

[57] ABSTRACT

The invention embodies a system and procedure for independently determining the surface emissivity of a mesh membrane material 12. The system is a closed one with respect to unwanted or uncorrected radiation outside the system and is composed of a radiometer 11 connected to a horn antenna 13, a test section 15 sealed to the horn antenna 13 and a cryogenically cooled matched load 17 exposed to the interior of the system. The material 12 is enclosed in a convection test chamber 14 within test section 15, heated within test chamber 14 and allowed to radiate within the system such that a component of the radiation energy of material 12 is measured by the radiometer 11 in terms of brightness temperature. The matched load 17 serves as the stabilizing source of uncorrelated radiation within the system by radiating within the system at a constant cryogenic temperature. The actual physical temperature of the material 12 is also measured during the heating process. The difference in brightness temperature over a selected period of time when divided by the physical temperature over the same period of time is the emissivity of the material 12 according to a derivation of the Raleigh-Jeans approximation for an ideal system free from all uncorrelated radiation.

18 Claims, 15 Drawing Figures

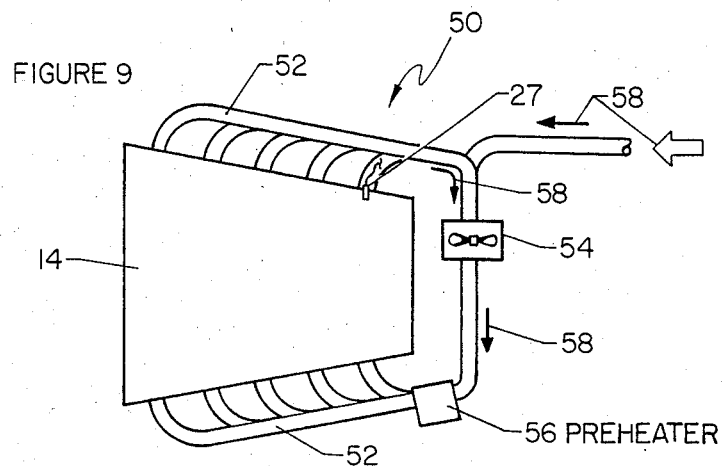
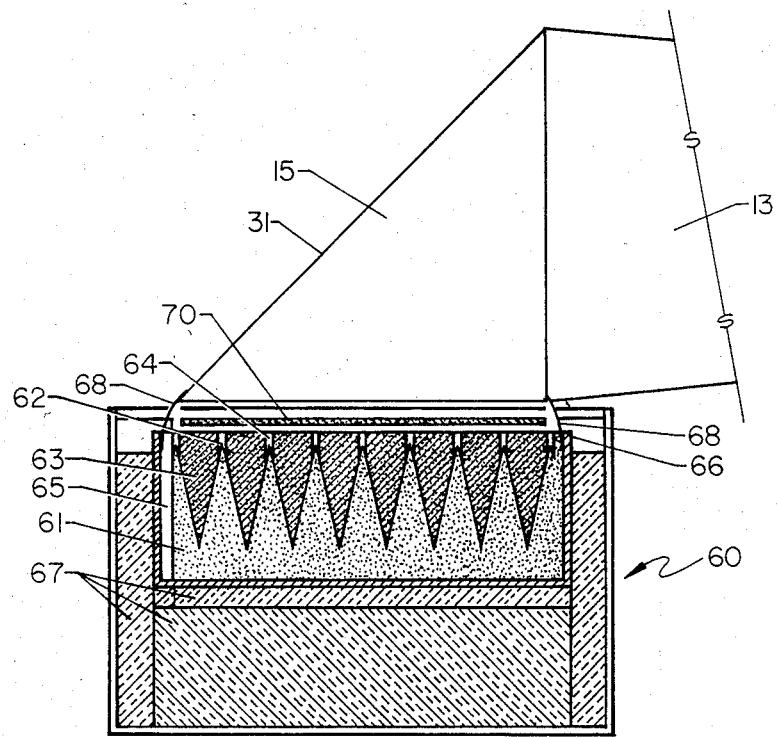

MEASUREMENT APPARATUS AND PROCEDURE FOR THE DETERMINATION OF SURFACE EMISSIVITIES

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

This invention relates to measurement of surface emissivities and in particular to a method and apparatus for independently determining the electromagnetic surface emissivity of a material.

Knowing the electromagnetic emissivity of reflective surfaces is important for applications in radiometry, both on the ground and in space, and especially for communication systems working at extremely high frequencies in space. For such applications, it is assumed that the absorptivity of these surfaces is equal to the emissivity. In the case of large deployable antennas in space employing mesh membrane surfaces, a large emissivity could introduce error effects due to temperature variations in space thereby making radio reception questionable or highly inaccurate. Consequently, the surface emissivity of rigid or large deployable antennas using mesh membrane material must be determined accurately so that emissivity can be decreased to zero by means of proper selection of surface coating and wire or rib spacing per unit area.

In the past, measurement of the electromagnetic properties of deployable reflectors have been achieved using active systems in anechoic chambers, i.e., the power of a transmitting horn antenna is reflected off the surface under test and the reflected signal is received by another horn antenna. First, the ratio of the received power to the transmitted power of a near perfect reflector is determined and, secondly, the equivalent power ratio of the mesh under test is measured. By comparing the two ratios, it is possible to deduce the sum of the emissivity losses plus the transmission losses. This procedure has the disadvantage that a separation of the emissivity losses from the sum of the losses is impossible. Further, since the emissivity loss is the dominating generator of white-noise and since in the determination of the white-noise, the emissivity is multiplied by its physical temperature according to a derivation of the Raleigh-Jeans approximation, the emissivity generates uncorrelated electromagnetic energy due to temperature variation in the mesh. This energy can be so high that a radiometer measurement either of the Earth's surface properties or of the universe are very inaccurate especially in cases of low contrast with the background. The interference from thermally induced noise becomes even more degrading to the measurement of the aforementioned properties when the physical temperatures across a large antenna (100 m) are not uniform and change along each orbit in space because of the sun's radiation.

The radioastronomy community evaluates the quality of its measurements in the universe by determining the G/T parameter (gain over input noise temperature) which defines the effects of the intervening atmosphere and the receiver noise contribution. However, for the design of large space antennas, the electromagnetic characteristics of surfaces, especially the emissivity, must be known before the planning of space programs and space structure designs. The G/T method is not applicable for such design work because the emissivity is lost in all of the other effects.

Accordingly, it is an object of the present invention to accurately determine the electromagnetic surface emissivity of a mesh membrane material of the type used in large deployable antennas.

It is a further object of the present invention to accurately determine the electromagnetic surface emissivity of any radiating material in order that the material may be manufactured so as to decrease the emissivity to zero thereby reducing the emissivity energy losses of the material.

A still further object of the present invention is to accurately determine the electromagnetic surface emissivity losses of a material independent of any other surface losses.

Other objects and advantages of the present invention will be readily apparent from the following description and drawings which illustrate a preferred embodiment of the present invention.

SUMMARY OF THE INVENTION

The system and procedure determine electromagnetic surface emissivity of a radiating material independent of any other surface losses. The system is a closed one with respect to unwanted or uncorrelated radiation outside the system and is composed of a radiometer connected to a horn antenna, a test section sealed to the horn antenna and a cryogenically cooled matched load exposed to the interior of the system. The test section houses the radiating material in a convection test chamber. The radiating material is heated in the test chamber and allowed to radiate within the system. The radiating material is positioned in the system on a 45° angle with respect to the radiometer and the matched load such that a component of the material's radiation energy generated during heating is measured by the radiometer in terms of brightness temperature. The cryogenically cooled matched load serves as the stabilizing source of uncorrelated radiation within the system by radiating at a constant temperature far below that of the system thereby also keeping the uncorrelated radiation at a minimum.

The procedure is based upon the Raleigh-Jeans approximation. The theoretical equation employed is derived for an ideal system free from all unwanted or uncorrelated radiation yielding the emissivity of the radiating material:

$$\epsilon = \frac{T_{B2} - T_{B1}}{T_{M2} - T_{M1}}$$

where $T_{B1}$, $T_{B2}$ are the radiation energies in terms of brightness temperature at a first and second point in time and $T_{M1}$, $T_{M2}$ are the physical temperatures of the radiating material at the first and second points in time. In operation, as the radiating material heats up from $T_{M1}$ to $T_{M2}$, the radiation energy as measured by the radiometer cycles from $T_{B1}$ to $T_{B2}$. The emissivity determined is the emissivity of the radiating material at its positioned angle within the system.

BRIEF DESCRIPTION OF THE DRAWINGS

FIG. 9 is a schematic view of the convection test chamber connected to the airflow system;

FIG. 10 is a cross-sectional view of the cryogenically cooled matched load;

DETAILED DESCRIPTION OF THE INVENTION

The procedure is based upon a basic law in physics that matter heated above absolute zero (0° Kelvin) to a physical temperature $T_M$ emits electromagnetic radiation according to Plank's radiation law. In the microwave region up to 100 GHz, the radiation energy P can be determined using a receiving radiometer system and the Raleigh-Jeans approximation:

$$P = k\Delta f T_B \tag{1}$$

where k is Boltzmann's constant, $\Delta f$ is the bandwidth of the receiving radiometer system and $T_B$ is the brightness temperature which is an indication of the radiation energy as measured by the radiometer. Alternatively, the sum of all the radiation collected by the input of the radiometer antenna feedpoint, as derived from the Raleigh-Jeans approximation is:

$$P = k\Delta f \epsilon T_M + P_o \tag{2}$$

where $\epsilon$ is the emissivity of the material under test and $P_o$ represents all other unwanted, random or uncorrelated noise sources, hereinafter referred to as uncorrelated radiation. If the physical temperature $T_M$ of the material under test increases from $T_{M1}$ to $T_{M2}$ while all other uncorrelated radiation effects $P_o$ are maintained at a constant, equation (2) yields two different levels of radiation energy within the system:

$$P_1 = k\Delta f \epsilon T_{M1} + P_o \tag{3}$$

$$P_2 = k\Delta f \epsilon T_{M2} + P_o \tag{4}$$

In addition to keeping $P_o$ extremely constant, it is obvious that the smaller $P_o$ is in relation to $k\Delta f\epsilon T_M$, the higher the accuracy of the measurements. The equivalent energies in terms of the measured brightness temperatures $T_B$ are $$P_1 = k\Delta f T_{B1} \tag{5}$$

and $$P_2 = k\Delta f T_{B2}. \tag{6}$$

Combining equations (3), (4), (5) and (6) yields the emissivity for an ideal systems free from all uncorrelated radiation $$\epsilon = \frac{T_{B2} - T_{B1}}{T_{M2} - T_{M1}} \tag{7}$$

This determination of surface emissivity is independent of all other surface losses such as transmission losses and losses due to reflection.

Figure 1:
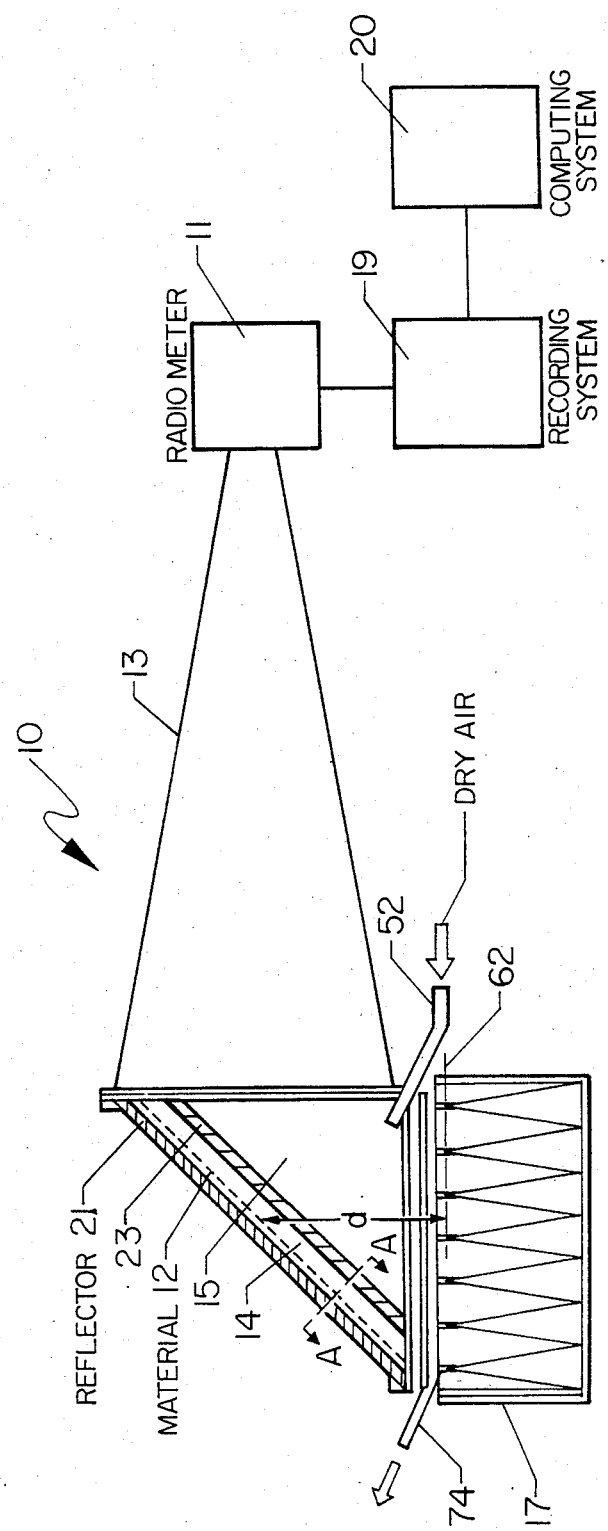
FIG. 1 is a cross-sectional, schematic view of the measurement apparatus used in the determination of electromagnetic surface emissivity according to the present invention.

Referring now more particularly to an embodiment of the invention selected for illustration in the drawings, FIG. 1 is a cross-sectional schematic view of the measurement apparatus, designated generally by 10, used in the independent determination of electromagnetic surface emissivity of a material 12 according to the present invention. Apparatus 10 consists of a radiometer 11, a horn antenna 13, a test section 15, a cryogenically cooled matched load 17, a recording system 19 and a computing system 20. Radiometer 11, horn antenna 13, test section 15 and matched load 17 comprise a system that is closed with respect to uncorrelated radiation. For purposes of description only, the specialized case of determining surface emissivity and losses for a mesh membrane material of the type used in large, deployable space antennas will be described. However, the invention is not limited to this case and can be sucessfully applied to other surfaces such as metal, metallized plastics, dielectric material and semiconductors. Thus, the procedure and apparatus will work effectively for any material that emits electromagnetic radiation upon being heated above absolute zero.

Figure 2:
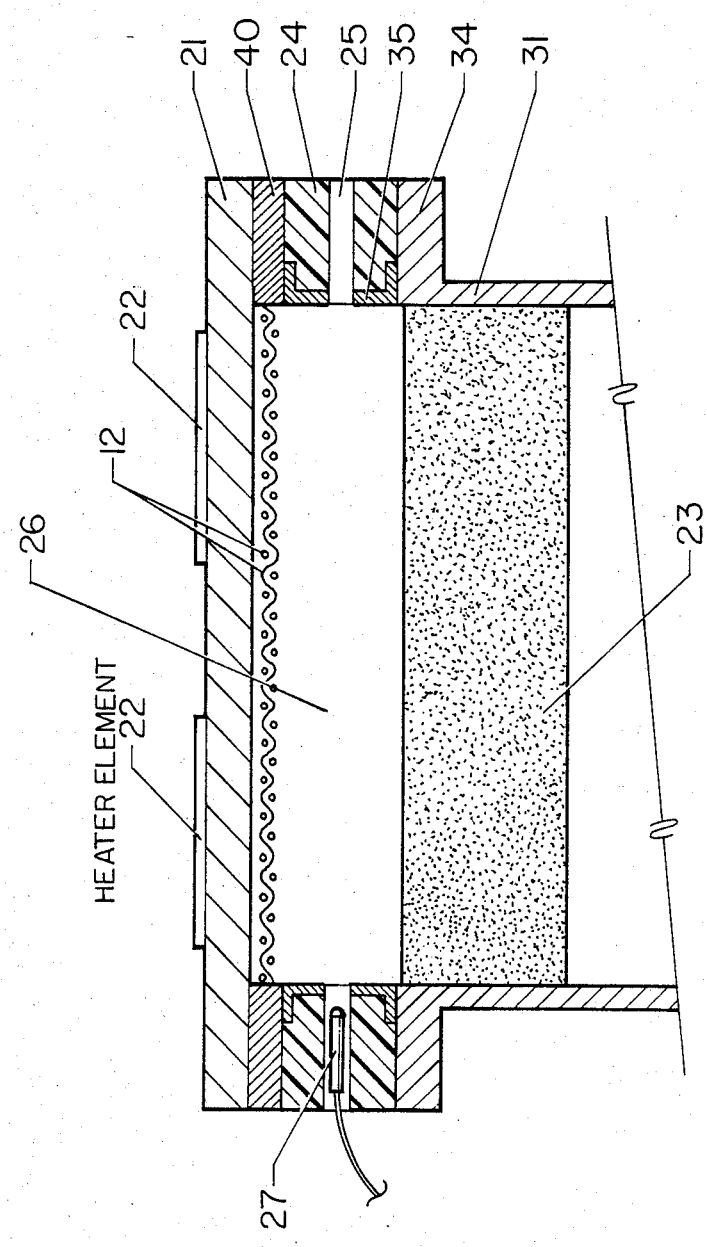
FIG. 2 is a cutaway view of the convection test chamber used in the measurement apparatus.

Referring to FIGS. 1 and 2, test section 15 houses mesh membrane material 12 within a preselected convection test chamber 14. Reflector plate 21 and mesh membrane material 12 are oriented at an angle of 45° with respect to both radiometer 11 and matched load 17. Load 17 is matched in that it achieves optimum stabilization of uncorrelated radiation within the system according to the angle of orientation that material 12 is mounted in the system. A cutaway view of the portion of test chamber 14 along line A—A, in FIG. 1, is shown in FIG. 2. Heater elements 22 are attached to the upper surface of a reflector plate 21 which is generally made of a good heat conductor such as copper. Attachment may be made using a heat-resistant bonding compound. Mesh membrane material 12 is mounted in a support mounting frame 40 and is located underneath plate 21 such that material 12 is not touching plate 21. Mounting frame 40 was made of aluminum for this particular embodiment. However, frame 40 may also be made of materials such as brass or copper. Frame material should be chosen for optimal mounting capability for the material to be tested. Spacing strips 24 are placed around the perimeter of the support frame 40 and are used to thermally isolate material 12 from extension walls 31 of test section 15. Spacing strips 24 are preferably made from material of very low heat conductivity such as bakelite. A thin, stainless steel U-channel 35 is fitted over spacing strips 24. Stainless steel was chosen because of its poor heat conductive properties. However, in order to provide good electromagnetic conductivity required inside test section 15 thereby preventing RF leakage, U-channel 35 is gold-plated about twice the penetration depth thickness of the center frequency of the radiometer 11. A heat convection space 26 is formed around material 12 as test chamber 14 is enclosed by a low loss polyurethane foam sheet 23. The foam used should be invisible to microwaves such as Emerson Cummings ECCO foam FPH. Spacing strips 24 contain airflow openings 25 through which air may flow thereby providing for heating by convection within space 26. The physical temperature of material 12 may be measured with a platinum resistor thermometer 27 mounted in one of the openings 25. Thermometer 27 measures the temperature of the airflow leaving heat convection space 26. The mass of material 12 is small enough that the convection air temperature is the same as the temperature of material 12. This was verified experimentally. It is important to keep temperature sensors remote from the material under test because the presence of any temperature dependent, secondary radiating material in close proximity to the material under test affects $P_o$ and thereby degrades the accuracy of the measurement.

The application of reflector plate 21 and material 12 in the form of a parabaloid as shown in FIG. 1 is desired to avoid phase front distortions. This eliminates the affects of incident and reflected waves in the near field of the system as will be described hereinbelow. However, note that the shape of the reflector plate 21 and material 12 is not limited to a paraboloid. A reflector and material in the shape of a flat surface may also be used. In fact, in most cases a flat surface reflector and material is easier to install, however, a flat surface needs critical adjustment within the system to compensate for phase front distortion.

Figure 3:
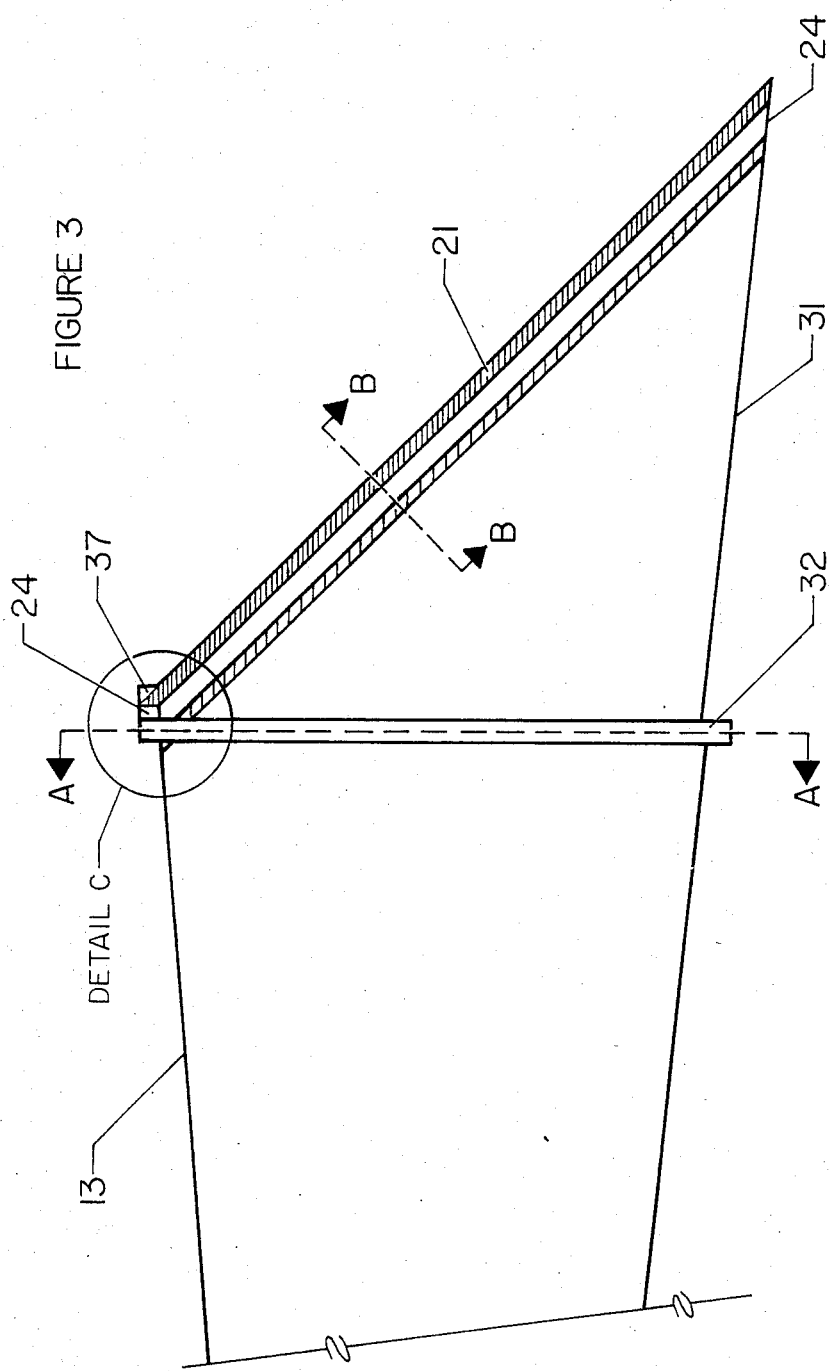
FIG. 3 is a detailed side view of the test section supporting the convection test chamber.
Figure 4:
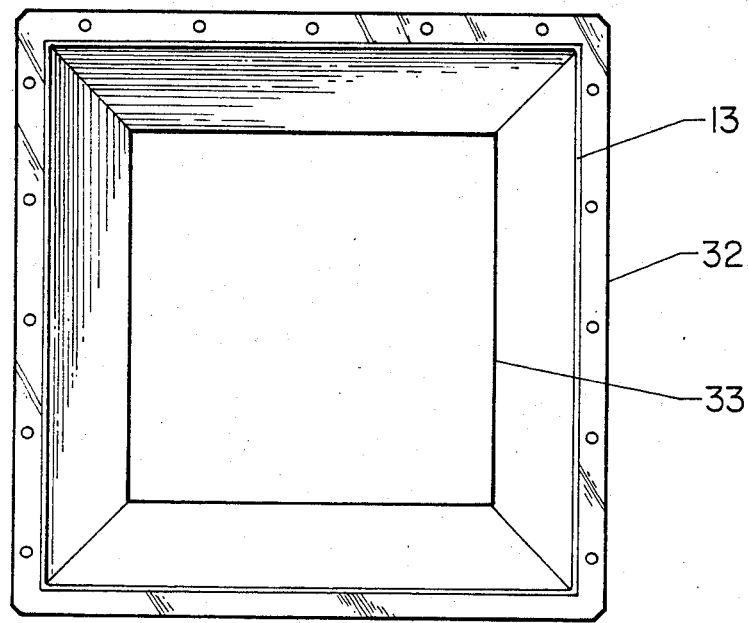
FIG. 4 is a cross-sectional view of the aperture of the horn antenna used in the measurement apparatus.

A detailed side view of the assembly of test section 15 which supports test chamber 14 is shown in FIG. 3. The assembly consists of two extension walls 31 (only one is shown), each mounted to one side to the side flanges 32 of horn antenna 13. The aperture 33 of horn antenna 13 is square shaped and is shown in FIG. 4 as view A—A of FIG. 3. The horn antenna aperture 33 may also be circular without degrading the functioning of the apparatus. The inside portion of each wall 31 is coated with a reflective coating such as aluminum. Thus, all radiation within test section 15 will be reflected and not absorbed by test section 15.

Figure 5:
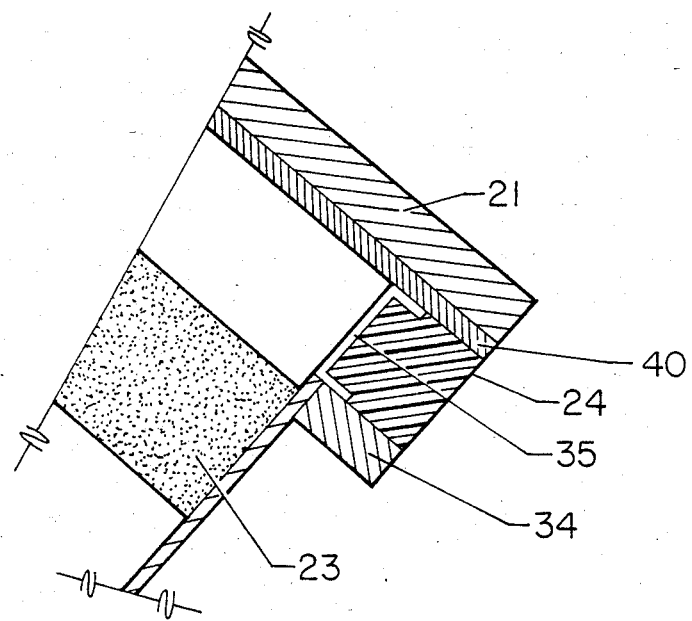
FIG. 5 is a cross-sectional view showing the detail of the thermal barrier between the reflector plate of the convection test chamber and the extension wall flange of the test section.

During operation of the apparatus, reflector plate 21 is heated by heater elements 22. In order to prevent any heat energy from flowing between test section 15 and the aluminum walls of horn antenna 13, test section 15 is thermally isolated from antenna 13 when test section 15 is mounted thereto. The smaller the heat conductivity between test section 15 and antenna 13, the more constant the powers $P_o$ in equations (2) through (4) will be. The construction that provides for such thermal isolation will be described in further detail using FIGS. 5 and 6. The thermal barrier between support mounting frame 40 and the flange 34 of extension wall 31 is shown in FIG. 5 as the view B—B of FIG. 3. The barrier consists of the same spacing strips 24 fitted with U-channel 35 which comprise part of test chamber 14 as earlier described. The equivalent upper thermal barrier between support mounting frame 40 and flange 34 of antenna 13 is cross-sectionally shown in FIG. 6 as detail C of FIG. 3. The spacing strip 24 provided with the U-channel 35 is pressed between flange 32 of antenna 13 and a bakelite wedge 37 and held together with nylon screws 39.

Figure 6:
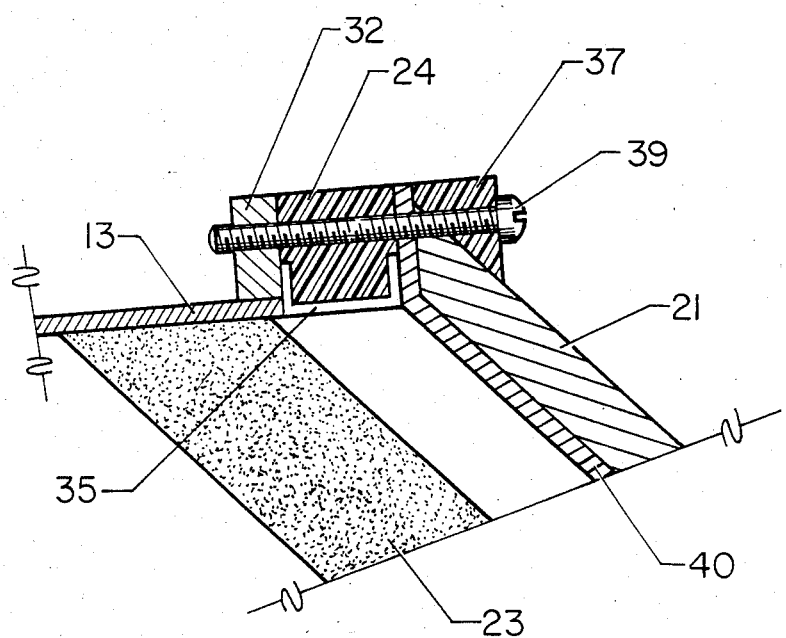
FIG. 6 is a cross-sectional view showing the detail of the thermal barrier between the reflector plate of the convection test chamber and the horn antenna flange.
Figure 8A:
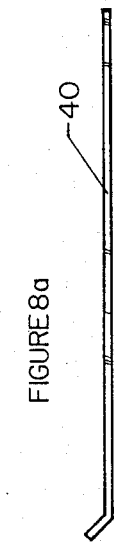
FIGS. 8(a) and 8(b) are a side and a top view respectively of the mesh membrane support mounting frame.
Figure 8B:
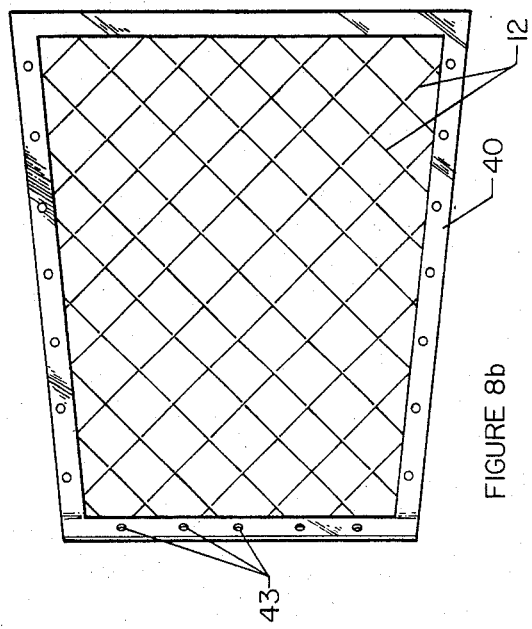
Figure 7A:
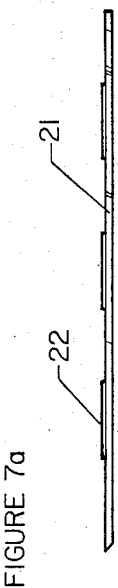
FIGS. 7(a) and 7(b) are a side and a top view, respectively, of the reflector plate with heater elements bonded on the top thereof.
Figure 7B:
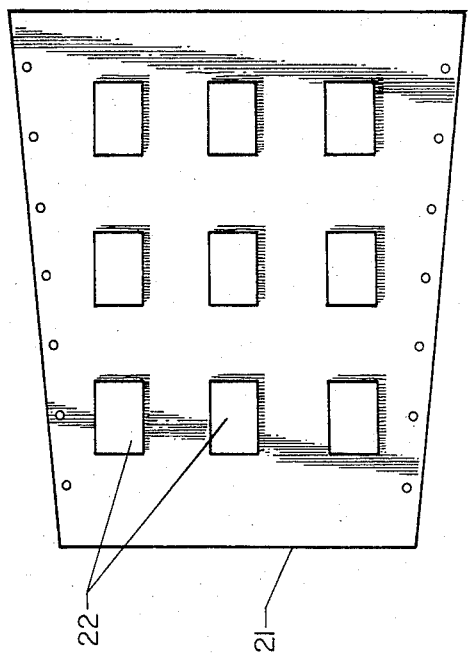

FIG. 7 shows reflector plate 21 in side view FIG. 7(a) and top view FIG. 7(b). In FIG. 7(b), nine heater elements 22 are located on top of plate 21 and bonded thereto with a heat conducting bonding compound. Heater elements 22 should have a heat capacity of approximately 2 kW in order to heat cycle the convection test chamber 14 in a reasonably short time. The mesh membrane support mounting frame 40 is shown from a side view in FIG. 8(a) and from a top view in FIG. 8(b). Frame 40 has the same outside dimensions as reflector plate 21 and is mounted underneath reflector plate 21 and held together with nylon screws (not shown). Top mounting holes 43 are the holes through which nylon screws 39 are placed as shown in FIG. 6. The mesh membrane material 12 is mounted onto frame 40 by pretensioning the wires and fastening the mesh to frame 40 with an electric conductive fastener such as a silver bonding compound or some other suitable bonding compound. Frame 40 may be used to mount any material and is not limited to the mesh membrane material. p It is very important to keep the test space free of humidity before the startup phase and through the entire testing operation. Thus, starting at room temperature and continuing through the heating up phase, the test space must be thoroughly purged with dry air. Keeping the mesh membrane material dry within the test chamber 14 is accomplished by using an airflow assembly such as the one shown schematically in FIG. 9 and designated generally by 50. On both sides of convection test chamber 14, manifolds 52 allow air to pass through the airflow openings 25 in spacing strips 24 (refer to FIG. 2) and circulate through the convection test chamber 14. Physical temperature of the material 12 is measured with platinum resistor thermometer 27 which is placed in one of the openings 25 in the airflow leaving test chamber 14 (refer to FIG. 2). For purposes of clarity resister 27 is shown in FIG. 9 in the airflow leaving test chamber 14. A fan 54 provides the necessary pressure differential to move the air as indicated by arrows 58. Dry air is supplied to airflow system 50 as indicated. A preheater 56 is provided to heat the entering dry air. The entire airflow assembly 50 should be thermally isolated to guarantee isothermal conditions.

Figure 11:
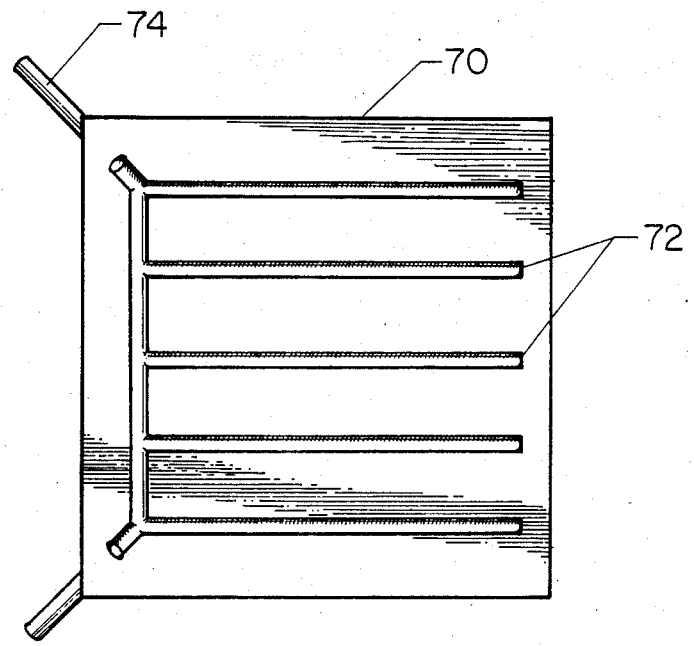
FIG. 11 is a bottom view of the foam cover for the cryogenically cooled matched load.

The cryogenically cooled matched load or cryoload, shown in FIG. 10 and designated generally by 60, serves as the stabilized source of uncorrelated radiation to keep $P_o$ constant in equations (2) through (4) by radiating within the system at a constant temperature. In order to keep $P_o$ small, cryoload 60 radiates at a temperature in the cryogenic region. Thus, cryoload 60 if filled with a cryogenic liquid such as helium, hydrogen, oxygen, nitrogen, argon or others. Since some cryogens are dangerous and others are so close to absolute zero that usage is very expensive, liquid nitrogen was chosen as the safest and least expensive of those mentioned above. In order to keep the evaporated cold gases from the liquid nitrogen from entering test section 15, a styrofoam cover 70 covers the top of cryoload 60 as shown in FIG. 10. Styrofoam cover 70 is shown in FIG. 11. The cover 70 should consist of a low density, very low loss styrofoam such as the ECCO foam FPH. Since the ECCO foam is a closed-cell structure, any moisture collection can collect only on the outer surface of cover 70. As mentioned earlier, it is very important to dry off all foam surfaces before each test series with appropriate means such as heat blowers, dehumidifying ovens, etc. Cover 70 is provided with guide channels 72 for the cold gases to move toward the exhaust tubings 74. These tubings reach outside test section 15 as shown in FIG. 1. An additional measure for preventing the buildup of moisture is the supply of dry air under low pressure into the space between cover 70 and foam sheet 23 as is shown in FIG. 1.

The cryoload 60, as shown in FIG. 10 consists of foam pyramids 61. Foam pyramids 61 are carbon treated and of an open-cell structure to let the liquid cryogen rise up to the peaks 62. The spaces between foam pyramids 61 are filled with low density polyurethane 63 which has a closed-cell structure. At the peaks 62 of the pyramids, vent holes 64 are provided for the escaping nitrogen gases. A filling tube 65 is installed to force the liquid nitrogen to the bottom and flow through bottom distribution lines (not shown) into the foam pyramids 61. To make certain that pyramids 61 are completely filled with liquid nitrogen a level indicator (not shown) is installed. Keeping the pyramids 61 completely filled assures a stable boiling temperature of the liquid nitrogen thereby keeping $P_o$ constant within the system. An aluminum or stainless steel box 66 houses pyramid foam 61 and the liquid nitrogen. Box 66 is insulated with low density (3 lbs/cu. ft.) polyurethane pieces 67 for minimum heat exchange with the outside environment. As can be seen in FIG. 10, test section 15 is placed just above cryoload 60. Thus, in order to maintain a closed system with respect to uncorrelated radiation outside the system, it is necessary to keep radiation from laboratory walls, fluorescent lights, etc. out of the test section 15. This is accomplished using aluminized mylar flaps 68 which are fastened to box 66 and attached to extension walls 31 on all sides of test section 15. Only two flaps 68 are shown for clarity. Attachment to extension walls 31 may be made by use of velcro fastener strips.

Figure 12:
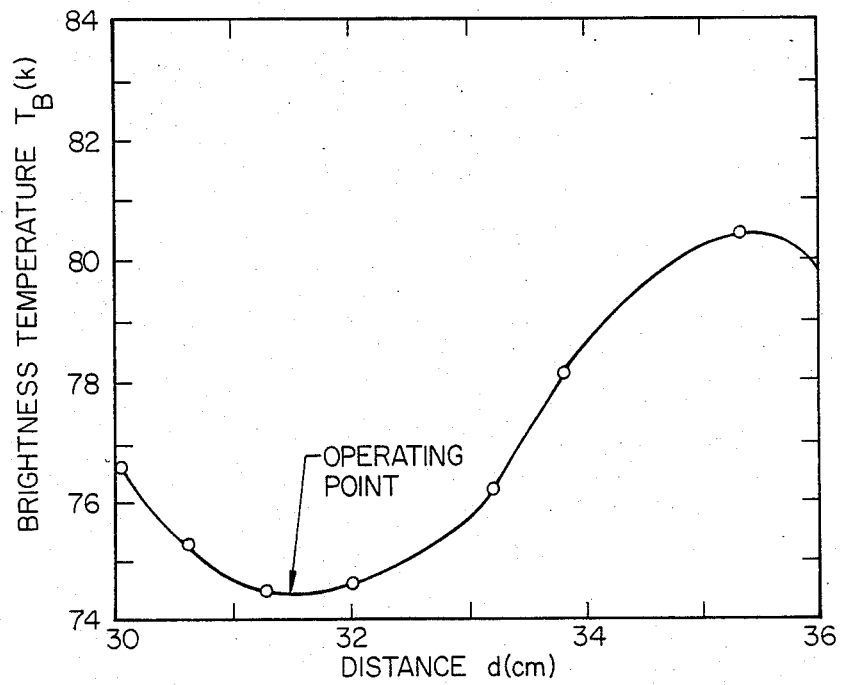
FIG. 12 is a graph depicting the brightness temperature dependence on the distance between the cryoload and the radiating material.

FIG. 12 shows the brightness temperature $T_B$ (in degrees Kelvin) dependence on the distance d (in centimeters) from the top of the peaks 62 in the center of the cryoload to the center of the surface of the mesh membrane material 12 as shown in FIG. 1. A standing wave characteristic exists because of the near-field condition or Fresnel zone effects inside the closed system. The operating distance d was chosen to be at the minimum as shown in FIG. 12. A distance change of less than one centimeter over a time period of more than ninety minutes is achieved by letting the cryoload come to an isothermal state of the boiling point with a minimum of nitrogen gas boiling off.

Reflection of radiation back into the cryoload will be negligible if the mesh membrane material test surface is in the form of a parabaloid as shown in FIG. 1. The focal point of the parabaloid should be the feedpoint of the horn antenna 13 in order to have more freedom from small changes in the distance d. The example of FIG. 12 is for a radiometer with a center frequency of 2.65 GHz and a bandwidth of 100 MHz. The reflection effects are part of $P_o$ and should be maintained constant over the measuring period. This is the main reason that the flat portion or the minimum in FIG. 12 was chosen as an operating point.

For the measurement of the surfaces losses, it is important to use a radiometer of high accuracy and precision in brightness temperature $T_B$ measurement. The radiometer should be stable over long periods of cycling and have the capability for long integration times. Any radiometer type (total power, double switched, correlation, etc.) is suitable for the measurement as long as the above requirements are met. The radiometer used in this invention is a third-generation, advanced, switched radiometer such as the one introduced by Dicke. This type of radiometer is nearly independent of gain variations and errors that are contributed by front-end losses. The radiometer therefore exhibits the long-term stability that is necessary to achieve absolute brightness temperature measurements to within a few hundredths Kelvin. The stability also eliminates the need for periodic calibration.

In operation, a proven sequence of procedures should be observed. Starting at room temperature, the test space must be thoroughly purged with dry air. After the brightness temperature $T_B$, as measured by the radiometer 11, reaches a minimum, preheater 56 is turned on and heaters 22 on reflector plate 21 are turned on. Fan 54 is also turned on to circulate air as indicated by arrows 58 through manifold 52 into test chamber 14 where the air molecules take on a higher temperature by convection underneath reflector plate 21 and thereby heat up mesh membrane material 12.

Figure 13:
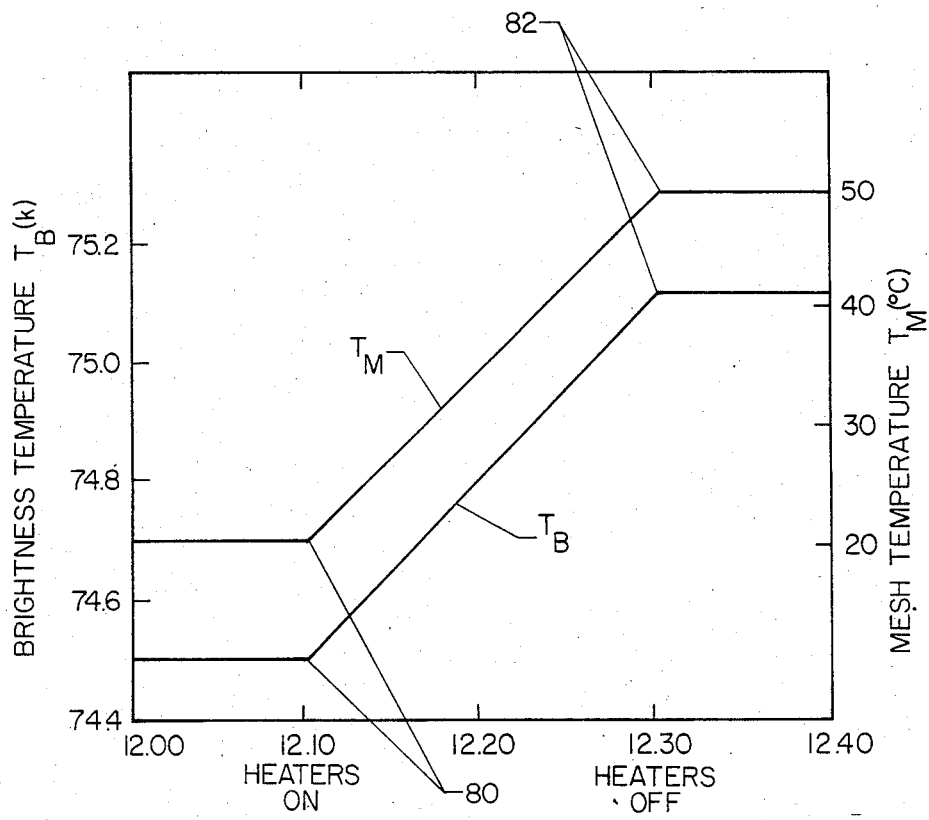
FIG. 13 is a graph depicting the brightness temperature variation and the physical temperature variation of the radiating material.

An example of the measurement procedure and results for the mesh membrane material as recorded by recording system 19 is illustrated in FIG. 13. The left ordinate of the diagram is the radiometer brightness temperature $T_B$ in degrees Kelvin. The abcissa represents the time during the measurement. The right ordinate is the physical temperature $T_M$ of the mesh membrane material 12 in degrees Celsius. Heaters 22 are turned on at the time indicated by 80 and represent conditions $T_{B1}$ and $T_{M1}$. Heaters 22 are then turned off at the time indicated by 82 and represent conditions $T_{B2}$ and $T_{M2}$. Using equation (7) and the temperatures recorded by recording system 19, computing system 20 calculated the emissivity $\epsilon$ for this mesh material to be 0.01855 at the angle of 45°. These measurements were conducted at 2.65 GHz with the radiometer integration time of twenty-two seconds and a brightness temperature resolution of 0.02 K.

The measurement procedure and apparatus are not limited to the case described herein of the reflector plate 21 and mesh material 12 oriented at an angle of 45° with respect to both the radiometer 11 and the matched load 17. Any angle of orientation that allows a component of the radiation energy to be received by the radiometer will allow measurement of the emissivity for that angle of orientation. The 45° angle was chosen to provide the largest component of radiation energy combined with optimal load matching.

In order for equation (7) to be true, it was essential to verify that $P_o$ could be held constant thereby allowing $P_o$ to cancel in equation (7). Verification of this concept was performed experimentally by installing an empty support mounting frame 40 into the apparatus and temperature cycling the test chamber 14 the same way as just described and shown in FIG. 13. If the brightness temperature $T_B$ changed appreciably the system would not be suitable for accurate measurement. In the case of the invention apparatus the maximum variation of $T_B$ for numerous cycling processes was 0.08° K. for 30° C. physical temperature $T_M$ variation. That represents an inaccuracy of seven percent for the sample case shown in FIG. 13. Considering the very low emissivity for this mesh sample, the measuring technique is very promising and opens new avenues to evaluate the electromagnetic quality of large surfaces especially in space applications.

The advantages of the present invention are numerous. Previously, there has been a void in the state-of-the-art to independently measure the surface emissivity and/or intrinsic losses of surface samples in the microwave region. This lack of technology posed a problem to the large space antenna planners and designers. The innovation of the invention presents the solution to the problem. The apparatus is a combination of a cryoload in connection with a test section capable of temperature cycling the sample material under test without changing all other characteristics of the system. An ultra-sensitive, stable and accurate radiometer receiver is used to measure the change in radiation energy of the sample material in terms of brightness temperature during the temperature cycling while the physical temperature of the material under test is measured during the temperature cycling using a simple platinum resistor. The design and use of the apparatus is in accordance with the theory derived for an ideal system free from all uncorrelated radiation. Thus, the procedure and apparatus of the present invention make it possible to fill the void in the state-of-the-art and give large space antenna experts a powerful tool to estimate the performance of radiometer systems in space.

Although the invention has been described relative to specific embodiments thereof, it is not so limited and numerous variations and modifications thereof will be readily apparent to those skilled in the art in the light of the above teachings. It is therefore to be understood that within the scope of the appended claims the invention may be practiced otherwise than as specifically described.

What is claimed as new and desired to be secured by Letters Patent of the United States is:

1. A method of determining the electromagnetic surface emissivity of a radiating material, independently of any other surface losses and in accordance with theoretical data derived for an ideal system free from all uncorrelated radiation, comprises the steps of:
   providing a connected system that is closed with respect to all uncorrelated radiation sources outside the system and capable of stabilizing uncorrelated radiation within the system;
   isolating said radiating material under test in a preselected chamber in a test section maintained within the system;
   maintaining said material and the system in a humid-free state;
   isothermally stabilizing the material in the system;
   heating the material from a first point in time to a second point in time;
   measuring the physical temperature of the heated material at said first and second points in time;
   measuring the radiation energy emitted by the heated material in terms of brightness temperature at said first and second points in time and using the difference in radiation energy in terms of brightness temperature between said first and second points in time divided by the difference in the physical temperature of the heated material between said first and said second points in time as being indicative of the electromagnetic surface emissivity of the heated material.

2. A method according to claim 1 wherein said step of isolating said radiating material under test in a test section maintained within the system includes the step of:
   thermally isolating the radiating material from any gain or loss in heat energy through conductance.

3. A method according to claim 1 wherein said step of maintaining the heated material and the system in a humid-free state includes the step of continually circulating dry air through the system.

4. A method according to claim 1 wherein said step of isothermally stabilizing the heated material in the system includes the step of preheating the radiating material by convection to an isothermal state.

5. A method according to claim 1 wherein said step of measuring the radiation energy includes the steps of positioning the heated material in the system so that a component of the radiation energy is received by a means for measuring the radiation energy.

6. A method according to claim 1 wherein stabilizing uncorrelated radiation within the system includes the step of cryogenically cooling a matched load means within the system; and
   allowing said matched load means to radiate within the system at a constant cryogenic temperature.

7. An apparatus for determining the electromagnetic surface emissivity of a test material independent of all other surface losses comprising:
   a radiation energy receiving means for receiving electromagnetic radiation in the form of brightness temperature emitted by said test material upon heating;
   a test section housing the test in a preselected chamber material and connected to said radiation energy receiving means;
   a means, on said test section, for heating the test material from a first point in time to a second point in time whereby the test material emits electromagnetic radiation;
   a means for measuring the physical temperature of the test material;
   a means for connecting said radiation energy receiving means to said test section;
   an uncorrelated radiation stabilizing means connected to said test section;
   a recording means for indicating the brightness temperature and the physical temperature of the test material; and
   a computing means for determining the electromagnetic emissivity of said test material from the brightness temperature and the physical temperature of the test material at the first and second points in time.

8. An apparatus as in claim 7 wherein said radiation energy receiving means, said test section and said uncorrelated radiation stabilizing means comprise the connected system that is closed with respect to all uncorrelated radiation outside said system and capable of stabilizing uncorrelated radiation within said system.

9. An apparatus as in claim 8 wherein said radiation energy receiving means comprises:
   a radiometer; and
   a horn antenna extending from said radiometer to said test section and sealed to said test section using a thermal barrier to form the seal between said antenna and said test section.

10. An apparatus as in claim 9 wherein said radiometer is a radiometer capable of long-term stability.

11. An apparatus as in claim 8 wherein said test section comprises:
a convection test chamber housing said test material;
supporting extension walls mounted to said radiometer means and to said test chamber for the purpose of supporting said test chamber and maintaining said system as closed to all uncorrelated radiation outside said system; and
dehumidifying means for maintaining the interior of said test section in a humid free state.

12. An apparatus as in claim 11 wherein said convection test chamber housing said test material comprises:
a reflector plate with heater elements attached thereto;
a mounting frame for supporting said material in said test chamber and located adjacent to said reflector plate such that said material does not touch said reflector plate;
spacing strips with airflow openings adjacent to said mounting frame and thermally separating said plate and said mounting frame from said supporting extension walls and said radiometer receiving means and, electromagnetically connecting said plate and said mounting frame with said supporting extension walls and said radiometer receiving means;
a foam means located between said supporting extension walls and enclosing said test chamber thereby forming a convection space around said material.

13. An apparatus as in claim 12 wherein said foam means comprises a foam sheet which is transparent with respect to microwaves.

14. An apparatus as in claim 13 wherein said foam sheet is comprised of a closed cell structure.

15. An apparatus as in claim 11 wherein the surfaces of said supporting extension walls exposed to the interior of said system comprise substantially totally reflective surfaces with respect to electromagnetic radiation.

16. An apparatus as in claim 11 wherein said dehumidifying means comprises means for continually circulating dry air through said test section.

17. An apparatus as in claim 8 wherein said uncorrelated radiation stabilizing means comprises a cryogenically cooled matched load for stabilizing uncorrelated radiation within said system.

18. An apparatus as in claim 17 wherein said cryogenically cooled matched load is covered by a means to transport cryogenic gases out of said system.

* * * * *